Figure 1:
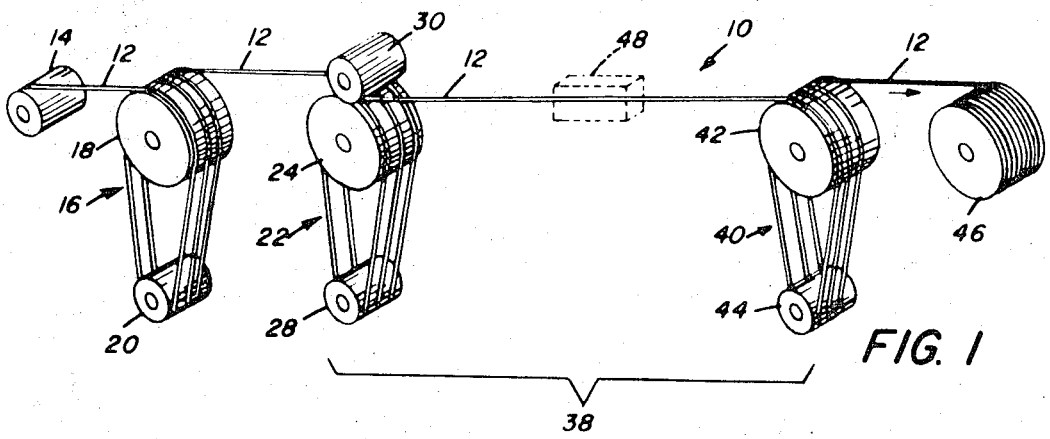
Figure 3:
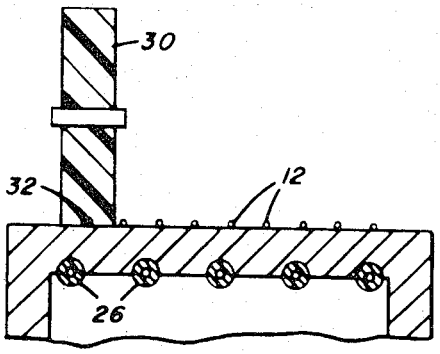
Figure 2:
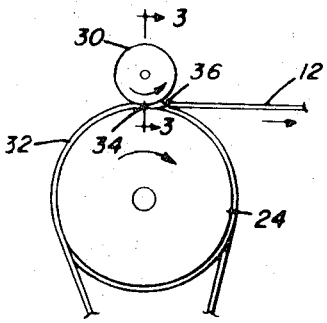
Figure 4:
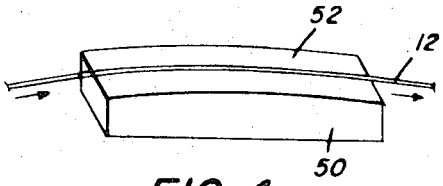
Figure 5:
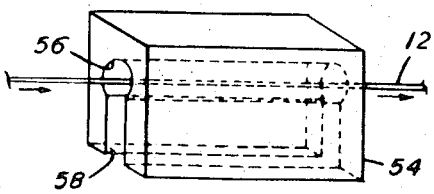

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1323

T883,020
PROCESS AND APPARATUS FOR DRAWING SYNTHETIC YARN

Darryl S. Addington, P.O. Box 511, Kingsport, Tenn. 37662

Filed July 24, 1969, Ser. No. 844,436
**Int. Cl. D02j *1/22***
U.S. Cl. 264—290
1 Sheet Drawing. 16 Pages Specification

Yarn drawing process wherein the draw point is localized by gripping the yarn at the exit point of the heated feed roll. A gripper roll presses the yarn against the feed roll after the yarn has been heated to drawing temperature. The yarn is stretched by a draw roll rotating faster than the feed roll. Additional heating means may optionally be used between the feed and draw rolls to effect a post-draw heat treatment. The yarn can be pretensioned before passage to the feed rolls. Polyester yarn, e.g. polyethylene terephthalate, can be processed using a draw ratio in excess of 3×. The result of the process is localization of the draw point leading to uniform drawing. The product is therefore uniformly dyeable.

Feb. 23, 1971 D. S. ADDINGTON T883,020

PROCESS AND APPARATUS FOR DRAWING SYNTHETIC YARN

Filed July 24, 1969

DARRYL S. ADDINGTON
INVENTOR.

BY Malcolm H. Pearce

ATTORNEY